United States Patent [19]

Lifka

[11] 3,948,048
[45] Apr. 6, 1976

[54] COAXIAL CYLINDRICAL FLUID DRIVE
[75] Inventor: Elmer Lifka, Western Springs, Ill.
[73] Assignee: Lawrence Peska Associates, Inc., New York, N.Y. ; a part interest
[22] Filed: Apr. 21, 1975
[21] Appl. No.: 570,022

[52] U.S. Cl. .................. 60/330; 192/58 A; 415/64
[51] Int. Cl.² ..................................... F16D 33/00
[58] Field of Search ............ 60/325, 330, 485, 327; 192/58 A; 415/64, 147; 74/572

[56] References Cited
UNITED STATES PATENTS
2,259,208 10/1941 Hutchison..................... 192/58 A FOREIGN PATENTS OR APPLICATIONS
6,787 8/1912 United Kingdom.................. 60/330

Primary Examiner—Edgar W. Geoghegan
Attorney, Agent, or Firm—Jack D. Slobod

[57] ABSTRACT

A fluid drive composed of three coaxial cylindrical members mounted coaxially within a cylindrical housing. The outer of the three coaxial members is fixedly secured to an output shaft and the inner of the three coaxial members is fixedly secured to an input shaft. The intermediate cylindrical member has vanes for fluid interaction with vanes on the inner and outer cylinders.

1 Claim, 2 Drawing Figures

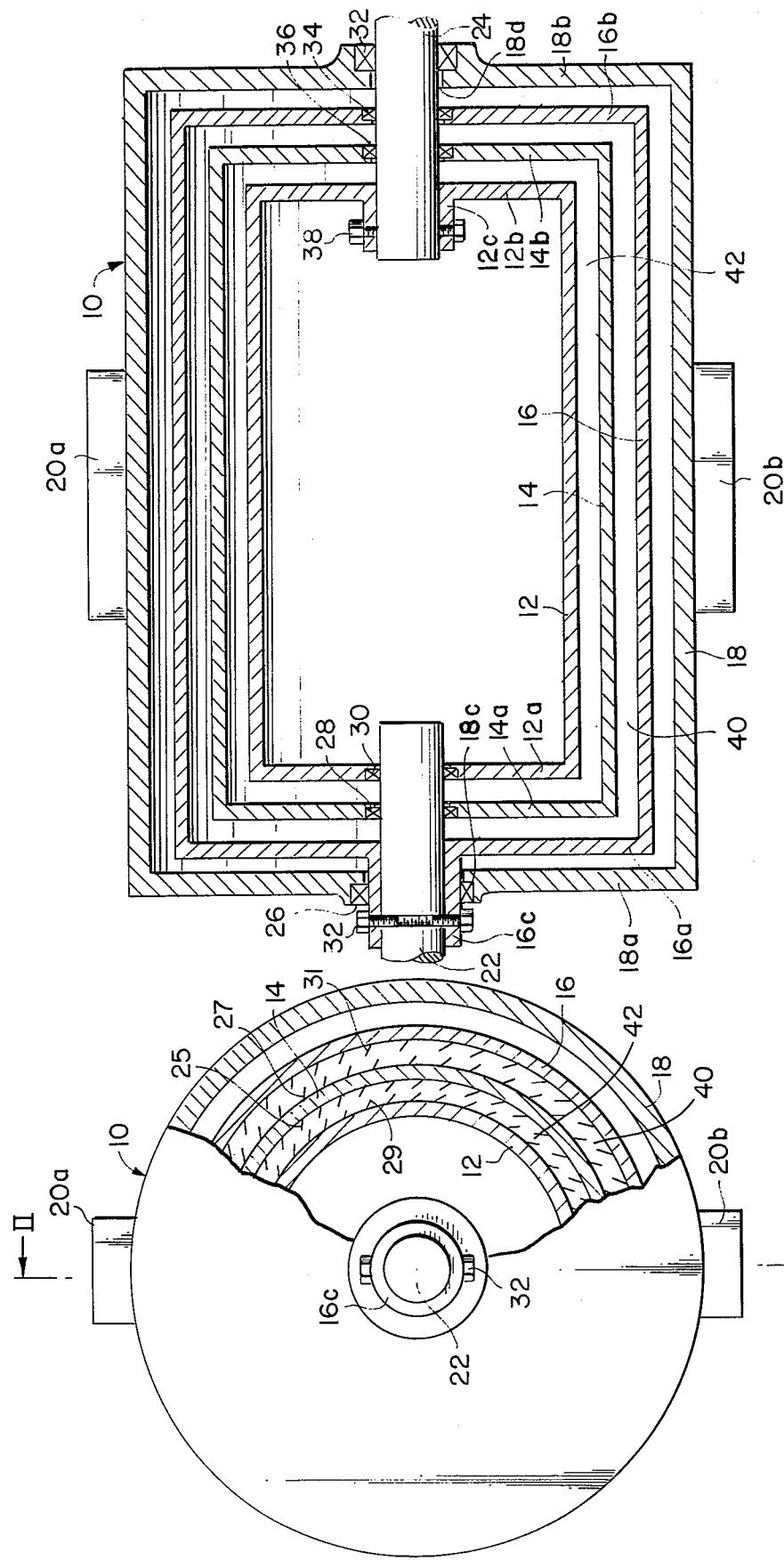

COAXIAL CYLINDRICAL FLUID DRIVE

FIELD OF THE PRESENT INVENTION

The present invention relates generally to shock absorbing fluid drives and torque converters and relates more specifically to a fluid drive having cylindrical coaxial members.

BACKGROUND OF THE PRESENT INVENTION

Fluid drives are used in drive trains for the purpose of absorbing shock or for torque multiplication. Present fluid drives are quite complicated, and expensive and utilize many parts. If a highly simplified and inexpensive fluid drive could be found, it could be utilized for many more applications and it would be feasible to completely replace worn out fluid drives rather than invest the labor in rebuilding them.

OBJECTS OF THE PRESENT INVENTION

It is an object of the present invention to provide a highly simplified fluid drive which is composed of the minimum number of moving parts.

It is a further object of the present invention to provide a fluid drive which is composed of geometrically simple parts in order to be inexpensive.

It is still another object of the present invention to provide a fluid drive which is both smooth and rugged.

SUMMARY OF THE PRESENT INVENTION

Briefly these and other objects are satisfied by providing a fluid drive composed of coaxial cylindrical members. An outer cylinder is fixedly secured to an output shaft and an inner cylinder is fixedly secured to an input shaft. An intermediate cylinder sandwiched between the inner and outer cylinders is provided with inwardly and outwardly directed vanes for fluid interaction with vanes on the inner and outer cylinders.

Other objects, features and advantages of the present invention will become apparent upon a perusal of the following detailed description when taken in conjunction with the appended drawing wherein:

FIG. 1 is a partially cross-sectioned end view of the fluid drive of the present invention.

FIG. 2 is a longitudinal cross-section of the fluid drive taken along the lines II—II in FIG. 1.

DETAILED DESCRIPTION

Referring to FIGS. 1 and 2, the fluid drive 10 of the present invention comprises three coaxial nested elongated metal cylinders 12, 14, and 16 coaxially within elongated metal cylindrical housing 18. Housing is provided with opposite circular end walls 18a and 18b and a central longitudinally directed pair of mounting flanges 20a and 20b.

Protruding from the center of end wall 18a is an output shaft 22. Input shaft 24 protrudes from the center of opposite end wall 18b and is colinear with output shaft 22. Input shaft 24 is fixedly secured to the innermost cylinder 12 while output shaft 22 is fixedly secured to outermost cylinder 16. Cylinder 14, which is sandwiched radially between cylinders 12 and 16, is mounted for free rotation and is provided with inwardly and outwardly projecting vanes 25 and 27 respectively for fluid interaction with outwardly projecting vanes 29 on innermost cylinder 12 and inwardly projecting vanes 31 on outermost cylinder 16.

Cylindrical member 16 is radially spaced within housing 18 and is provided with opposite end walls 16a and 16b which are respectively longitudinally spaced from housing end walls 18a and 18b. The center of end wall 16a is open and is provided with a small cylindrical portion 16c which is coaxial with output shaft 22. Coaxial portion 16c, which has an inside diameter for slideably receiving output shaft 22, protrudes longitudinally through a central hole 18c in end wall 18b. A bearing 26 is provided between hole 18c and cylindrical portion 16c to allow cylinder 16 to rotate in housing 18.

Output shaft 22 passes into fluid drive 10 from one end. Shaft 22 passes first through cylindrical portion 16c, then respectively through central bearings 28 and 30 retained in end walls 14a and 12a of cylinders 14 and 12. The output shaft 22 is fixedly secured to cylindrical member 16 by a bolt 32 which passes cross-wise through the protruding part of cylindrical portion 16c and shaft 22.

Input shaft 24 passes into fluid drive 10 from the opposite end. Shaft 24 passes first through end wall 18b via a bearing 32 retained in a central hole 18d. Shaft 24 next sequentially passes through bearings 34 and 36 retained in the end walls 16b and 14b of cylinders 16 and 14 and then is fixedly secured to the end wall 12b of cylinder 12.

The innermost cylinder 12 retains in end wall 12a the bearing 30 for receiving output shaft 22. the opposite end wall 12b is provided with a longitudinally inwardly directed small cylindrical portion 12c which has an inside diameter for slideably receiving input shaft 24. Shaft 24 is fixedly secured to innermost cylinder 12 by a bolt 38 passing transversely through cylindrical portion 12c and shaft 24 within cylinder 12.

The interior of housing 18 is filled with fluid having the same general viscosity as fluids used in fluid drives and torque converters. Thus fluid interaction is now possible in the radial space 40 between cylinders 16 and 14 and in the radial space 42 between cylinders 14 and 12.

The longitudinally directed radially projecting vanes 25, 27, 29 and 31 are provided canted to optimize fluid interaction as is well know. It is also noted that the various vanes may be provided with a slightly arcuate cross-section for a scooping action. The radial length and number of vanes on each member is based on the speed at which the various cylinders are to rotate as is well known in the art.

In operation of the fluid drive 10 the input shaft 24 is driven in rotation. This causes the fixedly secured inner cylinder 12 to rotate. The vanes 29 on cylinder 12 cause the fluid in space 42 to revolve. This revolving fluid acts on the inwardly directed vanes 25 on cylinder 14 causing cylinder 14 to rotate. The outwardly projecting vanes 27 on now rotating cylinder 14 cause the fluid in space 40 to revolve. The revolving fluid in space 40 acts on the inwardly directed vanes 31 on cylinder 16 causing cylinder 16 to revolve and thus causing the fixedly secured output shaft 24 to revolve.

It should be appreciated that what has been described is a simple fluid drive composed of geometrically simple and inexpensive coaxial cylindrical parts. It should also be appreciated that the drive is composed of only three major moving parts, the cylinders 12, 14 and 16.

Having described one embodiment of my invention, it should be understood that numerous modifications are possible within its spirit and scope.

What I claim is:

1. A fluid drive comprising: an elongated cylindrical housing having two end walls, colinear input and output shafts protruding centrally from opposite housing end walls, a first cylinder having exterior and interior walls coaxial with and radially spaced within said housing, said first cylinder being fixedly secured to said output shaft and being mounted rotatable with respect to said input shaft, said first cylinder having longitudinally directed vanes projecting inwardly from its interior walls, a second cylinder having interior and exterior walls coaxial with and radially spaced within said first cylinder, said second cylinder being mounted for rotation with respect to both said input and output shafts and having longitudinally directed vanes projecting outwardly from its exterior wall and inwardly from its interior wall, a third cylinder having an exterior wall radially spaced within and coaxial with said second cylinder and having longitudinally directed vanes projecting outward from its exterior wall and fluid within the radial spaces defined between the various aforementioned cylinders.

\* \* \* \* \*